United States Patent
Chen et al.

(10) Patent No.: US 10,275,041 B2
(45) Date of Patent: Apr. 30, 2019

(54) KEYBOARD DEVICE AND KEY STRUCTURE THEREOF

(71) Applicant: Primax Electronics Ltd., Taipei (TW)

(72) Inventors: Bo-An Chen, Taipei (TW); Chin-Sung Pan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/701,647

(22) Filed: Sep. 12, 2017

(65) Prior Publication Data

US 2018/0284904 A1 Oct. 4, 2018

(30) Foreign Application Priority Data

Mar. 31, 2017 (TW) .............................. 106111015 A (51) Int. Cl.
| | |
|---|---|
| *G06F 3/02* | (2006.01) |
| *H01H 13/86* | (2006.01) |
| *H01H 13/88* | (2006.01) |
| *H01H 13/78* | (2006.01) |
| *H01H 13/81* | (2006.01) |

(Continued)

(52) U.S. Cl.
CPC ............ *G06F 3/0202* (2013.01); *H01H 3/122* (2013.01); *H01H 13/78* (2013.01); *H01H 13/81* (2013.01); *H01H 13/85* (2013.01); *H01H 13/86* (2013.01); *H01H 13/88* (2013.01); *H01H 3/42* (2013.01); *H01H 15/102* (2013.01);

(Continued)

(58) Field of Classification Search
CPC ........ G06F 3/02; G06F 3/0202; G06F 3/0219; G06F 1/1662; H01H 13/14; H01H 13/705; H01H 13/7065; H01H 13/70; H01H 13/7006; H01H 13/7013; H01H 13/72; H01H 13/74; H01H 13/78; H01H 13/81; H01H 13/86; H01H 13/88; H01H 3/122; H01H 3/42; H01H 13/85; H01H 15/102; H01H 2215/00; H01H 2215/006; H01H 2217/004; H01H 2225/028; H03K 17/965; H03K 17/967
See application file for complete search history.

(56) References Cited

U.S. PATENT DOCUMENTS

| | | | | |
|---|---|---|---|---|
| 2002/0080122 | A1* | 6/2002 | Ostergard | H01H 13/702 345/168 |
| 2002/0179423 | A1* | 12/2002 | Nozawa | H01H 13/7006 200/517 |

(Continued)

*Primary Examiner* — Tom V Sheng
(74) *Attorney, Agent, or Firm* — Kirton McConkie; Evan R. Witt (57) ABSTRACT

A keyboard device includes a circuit board and plural key structures. Each key structure includes a keycap, a hinge element and a base. The hinge element includes a first lateral wing part, a second lateral wing part and a bendable part. The first lateral wing part is connected between the keycap and the base. The second lateral wing part is connected between the keycap and the base. The bendable part is connected between the first lateral wing part and the second lateral wing part. The bendable part is thinner than the first lateral wing part and the second lateral wing part. While the keycap is moved upwardly or downwardly relative to the base, a bending angle of the hinge element and a relative position between the first base shaft and the first receiving hole are changed.

18 Claims, 7 Drawing Sheets

(51) Int. Cl.
*H01H 3/12* (2006.01)
*H01H 13/85* (2006.01)
*H01H 3/42* (2006.01)
*H01H 15/10* (2006.01)

(52) U.S. Cl.
CPC ... *H01H 2215/00* (2013.01); *H01H 2215/006* (2013.01); *H01H 2217/004* (2013.01); *H01H 2225/028* (2013.01)

(56) References Cited

U.S. PATENT DOCUMENTS

| | | | |
|---|---|---|---|
| 2003/0168328 A1* | 9/2003 | Sato | G06F 1/1616 200/344 |
| 2010/0213041 A1* | 8/2010 | Chen | H01H 13/705 200/314 |
| 2012/0193202 A1* | 8/2012 | Chen | H01H 3/125 200/344 |
| 2013/0228433 A1* | 9/2013 | Shaw | G06F 1/1618 200/5 A |
| 2014/0116865 A1* | 5/2014 | Leong | G06F 3/0202 200/344 |
| 2015/0090568 A1* | 4/2015 | Chen | H01H 3/125 200/344 |
| 2016/0351360 A1* | 12/2016 | Knopf | H01H 13/023 |
| 2017/0345589 A1* | 11/2017 | Wu | H01H 13/785 |
| 2017/0365422 A1* | 12/2017 | Watanabe | H01H 13/14 |

* cited by examiner

KEYBOARD DEVICE AND KEY STRUCTURE THEREOF

FIELD OF THE INVENTION

The present invention relates to an input device, and more particularly to a keyboard device.

BACKGROUND OF THE INVENTION

Generally, the widely-used peripheral input device of a computer system includes for example a mouse device, a keyboard device, a trackball device, or the like. Via the keyboard device, characters or symbols can be directly inputted into the computer system. As a consequence, most users and most manufacturers of input devices pay much attention to the development of the keyboard devices.

Figure 1:
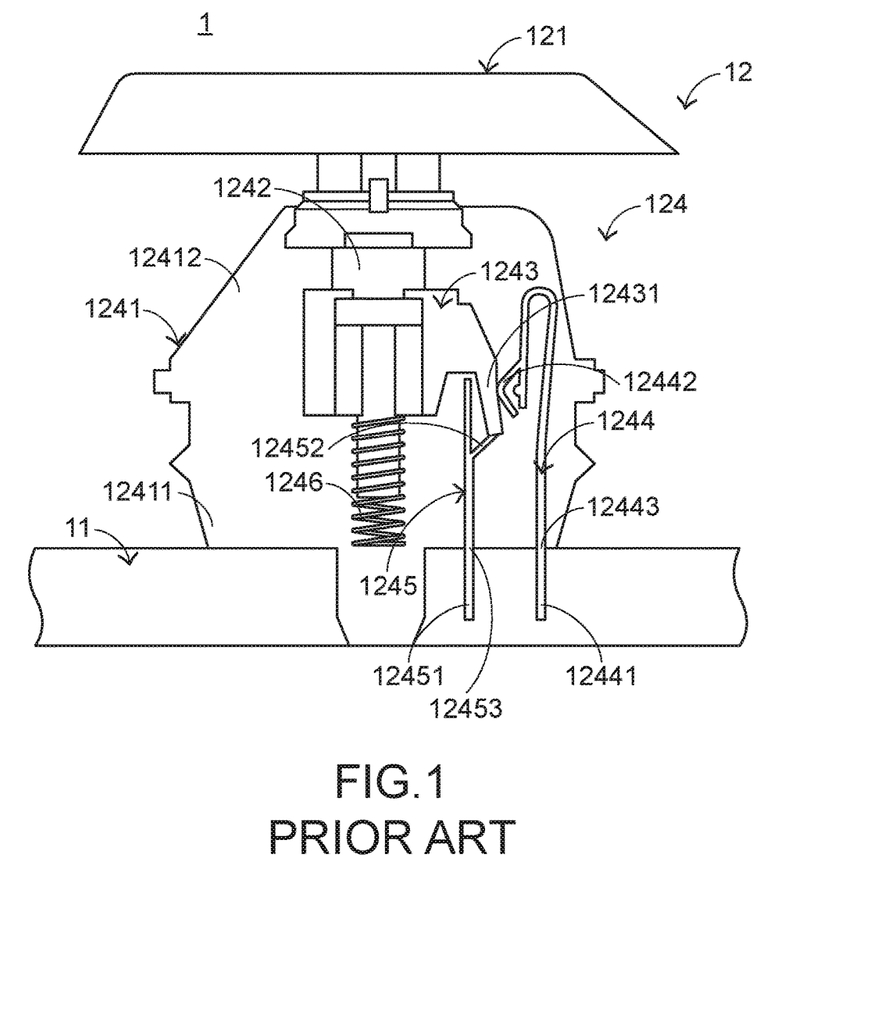
FIG. 1 is a schematic cross-sectional view illustrating a mechanical key structure of a conventional keyboard device.
Figure 2:
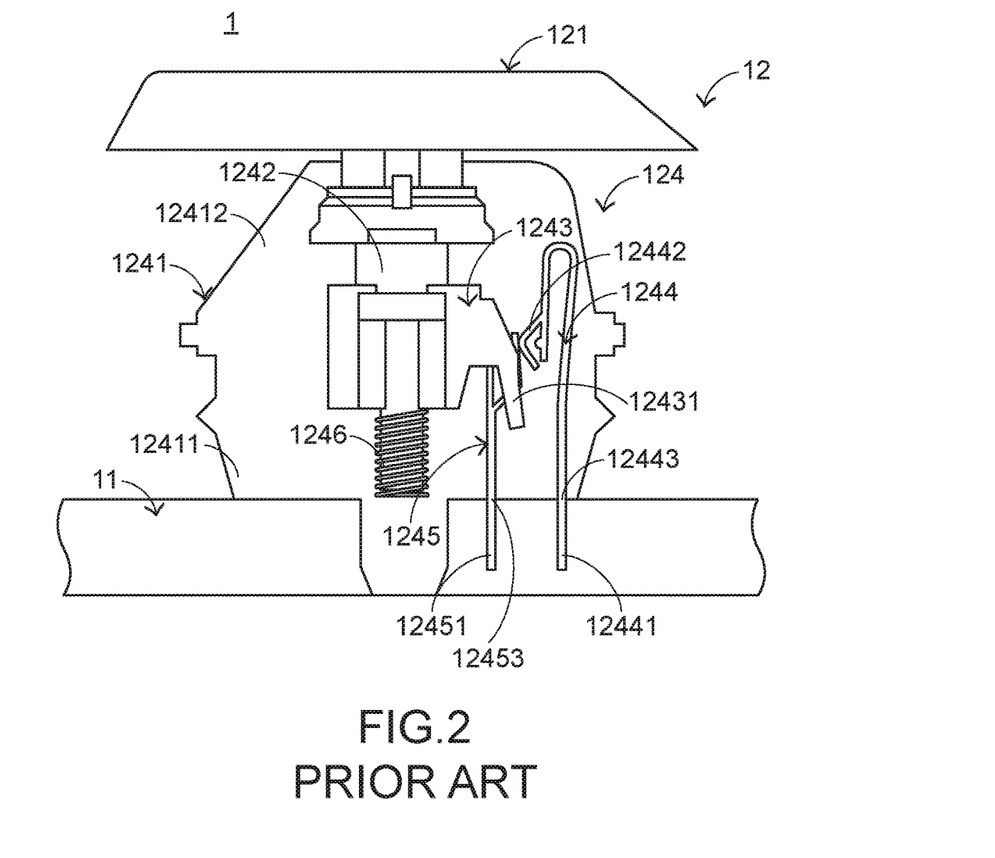
FIG. 2 is a schematic cross-sectional view illustrating the mechanical switch of the conventional keyboard device when a keycap of the mechanical key structure is depressed.

Hereinafter, the structure and function of a conventional keyboard device will be illustrated with reference to FIGS. 1 and 2. FIG. 1 is a schematic cross-sectional view illustrating a mechanical key structure of a conventional keyboard device. FIG. 2 is a schematic cross-sectional view illustrating the mechanical switch of the conventional keyboard device when a keycap of the mechanical key structure is depressed. The keyboard device 1 comprises plural mechanical key structures 12 and a circuit board 11. For succinctness, only one mechanical key structure 12 is shown in the drawings. Each mechanical key structure 12 comprises a keycap 121 and a mechanical switch 124. The mechanical switch 124 comprises a casing 1241, a push element 1242, a linkage element 1243, a first spring strip 1244, a second spring strip 1245 and an elastic element 1246. The linkage element 1243, the elastic element 1246, at least a part of the push element 1242, at least a part of the first spring strip 1244 and at least a part of the second spring strip 1245 are accommodated within the casing 1241.

The casing 1241 comprises a pedestal 12411 and an upper cover 12412. The pedestal 12411 is covered by the upper cover 12412. Moreover, the upper cover 12412 has an opening (not shown). A first end of the push element 1242 is penetrated through the opening and contacted with the keycap 121. A second end of the push element 1242 is disposed within the casing 1241 and connected with the linkage element 1243. The linkage element 1243 is located at a middle region of the pedestal 12411. Moreover, the linkage element 1243 is movable upwardly or downwardly relative to the pedestal 12411. The linkage element 1243 has a protrusion structure 12431. The protrusion structure 12431 is extended from a sidewall of the linkage element 1243 toward the first spring strip 1244. The elastic element 1246 is located under the linkage element 1243. A first end of the elastic element 1246 is connected with the linkage element 1243. A second end of the elastic element 1246 is fixed on the pedestal 12411. Moreover, the elastic element 1246 provides an elastic force to the linkage element 1243.

The first spring strip 1244 is located near a sidewall of the pedestal 12411. The first spring strip 1244 comprises a first electric connection part 12441, an elastic part 12442 and a first fixing part 12443. The first fixing part 12443 is fixed on the pedestal 12411. Moreover, the first fixing part 12443 is arranged between the first electric connection part 12441 and the elastic part 12442. The elastic part 12442 is disposed within the casing 1241 and contacted with the protrusion structure 12431 of the linkage element 1243. Moreover, the elastic part 12442 can be swung relative to the first fixing part 12443. After the first electric connection part 12441 is penetrated downwardly through the pedestal 12411, the first electric connection part 12441 is contacted and electrically connected with the circuit board 11. The second spring strip 1245 is arranged between the linkage element 1243 and the first spring strip 1244. The second spring strip 1245 comprises a second electric connection part 12451, a conduction part 12452 and a second fixing part 12453. The second fixing part 12453 is fixed on the pedestal 12411. Moreover, the second fixing part 12453 is arranged between the second electric connection part 12451 and the conduction part 12452. The conduction part 12452 is disposed within the casing 1241. After the second electric connection part 12451 is penetrated downwardly through the pedestal 12411, the second electric connection part 12451 is contacted and electrically connected with the circuit board 11.

While the keycap 121 is depressed, the keycap 121 is moved downwardly to push the push element 1242. Since the linkage element 1243 is connected with the push element 1242, the linkage element 1243 is moved downwardly with the push element 1242. At the same time, the elastic element 1246 is compressed to generate the elastic force. As the linkage element 1243 is moved downwardly, the protrusion structure 12431 of the linkage element 1243 is contacted with the elastic part 12442 of the first spring strip 1244. Moreover, the protrusion structure 12431 is moved downwardly relative to the elastic part 12442 so as to push the elastic part 12442. Consequently, the elastic part 12442 is swung relative to the first fixing part 12443. As the linkage element 1243 is continuously moved downwardly, the swung elastic part 12442 correspondingly contacts and collides with the conduction part 12452 of the second spring strip 1245. Meanwhile, as shown in FIG. 2, the first spring strip 1244 and the second spring strip 1245 are in contact with each other. Consequently, the circuit board 11 generates a corresponding key signal. When the elastic part 12442 of the first spring strip 1244 collides with the conduction part 12452 of the second spring strip 1245, a click sound is generated. Due to the click sound, the user can feel the feedback of depressing the keycap 121. Moreover, when the keycap 121 is no longer depressed, the linkage element 1243 and the push element 1242 are moved upwardly in response to the elastic force of the elastic element 1246. Consequently, the keycap 121 is returned to its original position as shown in FIG. 1.

However, the key structure 12 of the conventional mechanical keyboard device 1 still has some drawbacks. For example, the contact area between the keycap 121 and the push element 1242 is too small. Consequently, the keycap 121 cannot be uniformly supported by the push element 1242. Since the keycap 121 is rocked and unstable in the forward/backward direction or the leftward/rightward direction, the tactile feel of operating the keycap 121 is deteriorated. Especially when the edge of the keycap 121 is depressed, the rocking extent of the keycap 121 becomes serious. In other words, the keyboard device and the key structure need to be further improved.

SUMMARY OF THE INVENTION

An object of the present invention provides a key structure with a hinge element. Due to the hinge element, the keycap can be smoothly moved in the upward direction or the downward direction while the keycap is depressed and released. Consequently, the rocking problem of the keycap is avoided.

Another object of the present invention provides a keyboard device with the above key structure. Consequently, the tactile feel of operating the keycap is enhanced.

In accordance with an aspect of the present invention, there is provided a key structure. The key structure includes a keycap, a hinge element and a base. The hinge element includes a first lateral wing part, a second lateral wing part and a bendable part. The bendable part is connected between the first lateral wing part and the second lateral wing part. The bendable part is thinner than the first lateral wing part and the second lateral wing part. The first lateral wing part and the second lateral wing part are connected with the keycap. The first lateral wing part includes a first receiving hole. The second lateral wing part includes a second receiving hole. The base includes a first base shaft and a second base shaft. The first base shaft is penetrated through the first receiving hole. The second base shaft is penetrated through the second receiving hole. While the keycap is moved upwardly or downwardly relative to the base, a bending angle of the hinge element and a relative position between the first base shaft and the first receiving hole are changed.

In accordance with another aspect of the present invention, there is provided a keyboard device. The keyboard device includes a circuit board and plural key structures. The plural key structures are installed on the circuit board. When one of the plural key structures is depressed, the circuit board generates a corresponding key signal. Each of the plural key structures includes a keycap, a hinge element and a base. The hinge element includes a first lateral wing part, a second lateral wing part and a bendable part. The bendable part is connected between the first lateral wing part and the second lateral wing part. The bendable part is thinner than the first lateral wing part and the second lateral wing part. The first lateral wing part and the second lateral wing part are connected with the keycap. The first lateral wing part includes a first receiving hole. The second lateral wing part includes a second receiving hole. The base includes a first base shaft and a second base shaft. The first base shaft is penetrated through the first receiving hole. The second base shaft is penetrated through the second receiving hole. While the keycap is moved upwardly or downwardly relative to the base, a bending angle of the hinge element and a relative position between the first base shaft and the first receiving hole are changed.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3:
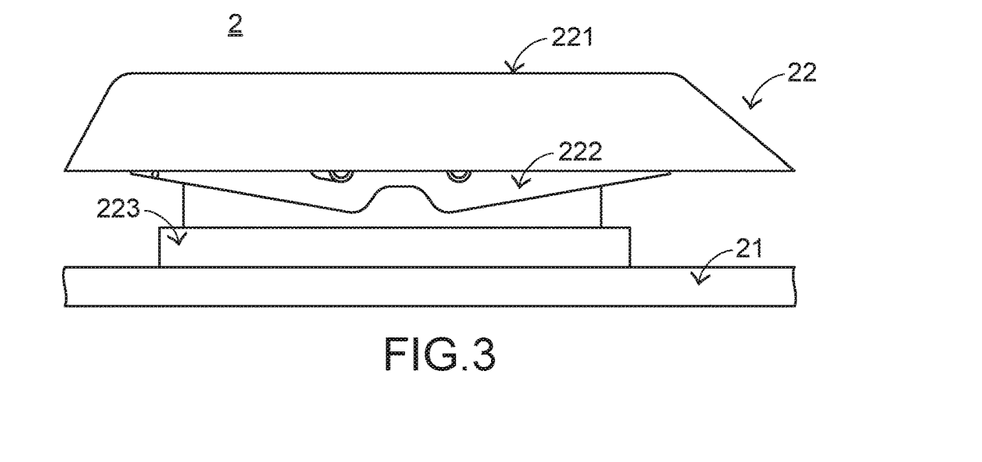
FIG. 3 is a schematic cross-sectional view illustrating a key structure of a keyboard device according to a first embodiment of the present invention.

FIG. 3 is a schematic cross-sectional view illustrating a key structure of a keyboard device according to a first embodiment of the present invention. For succinctness, only one key structure is shown in FIG. 3. The keyboard device 2 comprises a circuit board 21 and plural key structures 22. The plural key structures 22 are installed on the circuit board 21. These key structures 22 are classified into some types, e.g., ordinary keys, numeric keys and function keys. When one of the key structures 22 is depressed by the user's finger, a corresponding key signal is generated to the computer, and thus the computer executes a function corresponding to the depressed key structure. For example, when an ordinary key is depressed, a corresponding English letter or symbol is inputted into the computer. When a numeric key is depressed, a corresponding number is inputted into the computer. In addition, the function keys (F1~F12) can be programmed to provide various quick access functions.

Figure 4:
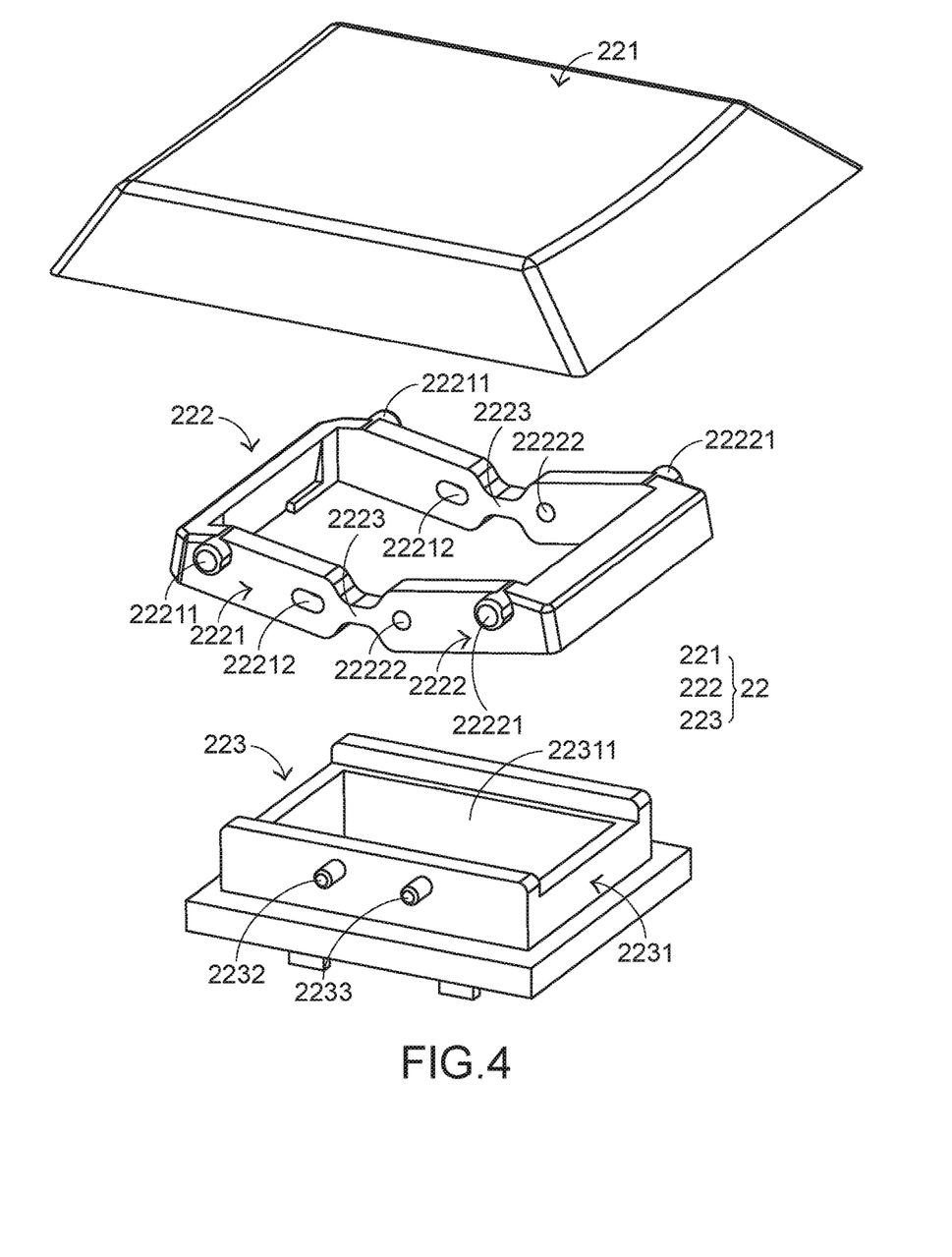
FIG. 4 is a schematic exploded view illustrating the relationship between a keycap, a hinge element and a base of the key structure according to the first embodiment of the present invention.
Figure 5:
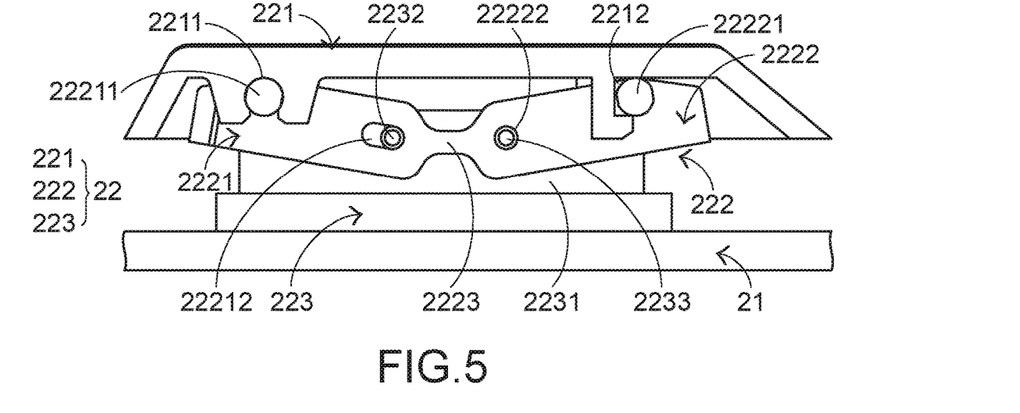
FIG. 5 is a schematic cross-sectional view illustrating the relationship between the keycap, the hinge element and the base of the key structure and the circuit board according to the first embodiment of the present invention.

Please refer to FIGS. 4 and 5. FIG. 4 is a schematic exploded view illustrating the relationship between a keycap, a hinge element and a base of the key structure according to the first embodiment of the present invention. FIG. 5 is a schematic cross-sectional view illustrating the relationship between the keycap, the hinge element and the base of the key structure and the circuit board according to the first embodiment of the present invention. Each key structure 22 comprises a keycap 221, a hinge element 222 and a base 223. The keycap 221 has two lateral sides. Each lateral side of the keycap 221 comprises a locking hole 2211 and a sliding groove 2212. The hinge element 222 comprises a first lateral wing part 2221, a second lateral wing part 2222 and a bendable part 2223. The bendable part 2223 is arranged between the first lateral wing part 2221 and the second lateral wing part 2222. Moreover, the bendable part 2223 is thinner than the first lateral wing part 2221 and the second lateral wing part 2222. Consequently, the bendable part 2223 can be bent. The first lateral wing part 2221 comprises a first hinge shaft 22211 and a first receiving hole 22212. The first receiving hole 22212 is arranged between the first hinge shaft 22211 and the bendable part 2223. The first hinge shaft 22211 is pivotally coupled to the locking hole 2211 of the keycap 221. The second lateral wing part 2222 comprises a second hinge shaft 22221 and a second receiving hole 22222. The second receiving hole 22222 is arranged between the second hinge shaft 22221 and the bendable part 2223. The second hinge shaft 22221 is penetrated through the sliding groove 2212 of the keycap 221 and movable relative to the sliding groove 2212. Preferably, the hinge element 222 is an integral structure that is made of a plastic material.

The base 223 comprises an outer shell 2231, a first base shaft 2232 and a second base shaft 2233. The outer shell 2231 is fixed on the circuit board 21. The first base shaft 2232 and the second base shaft 2233 are protruded externally from the outer shell 2231. The outer shell 2231 comprises a hollow part 22311. The hollow part 22311 runs through the base 223. Moreover, the associated components are installed in the hollow part 22311 and/or penetrated through the hollow part 22311. The first base shaft 2232 is penetrated through the first receiving hole 22212. Moreover, the relative position between the first base shaft 2232 and the first receiving hole 22212 is changeable according to the bending angle of the hinge element 222. The second base shaft 2233 is penetrated through and pivotally coupled to the second receiving hole 22222.

Figure 6:
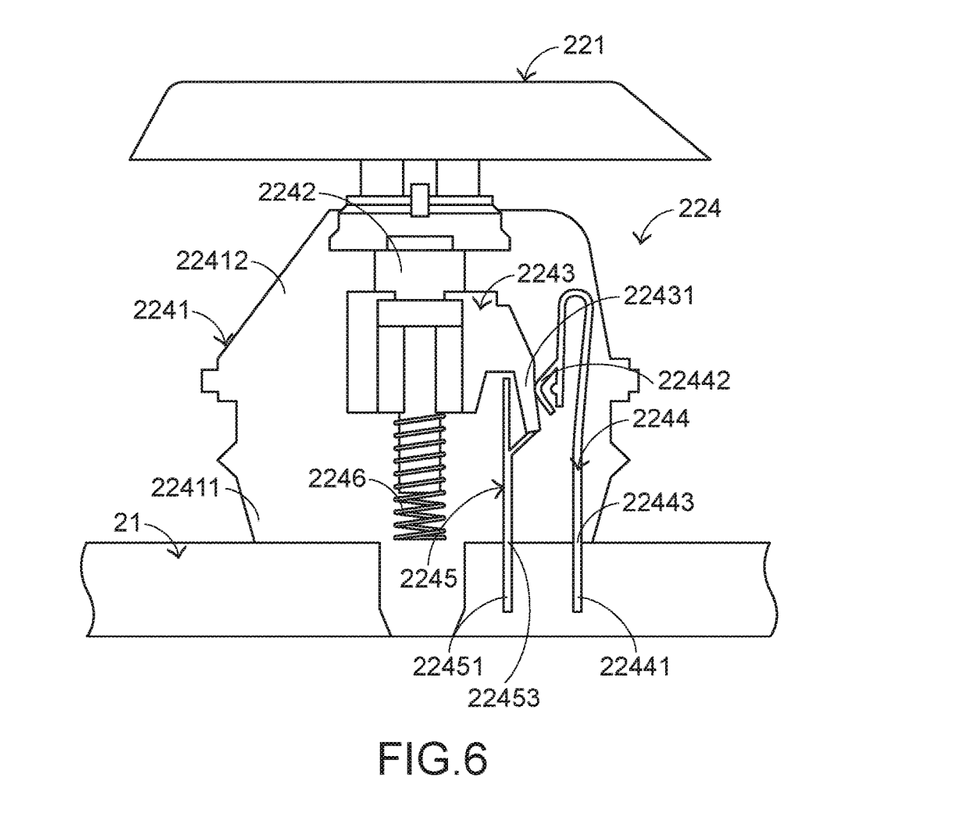
FIG. 6 is a schematic cross-sectional view illustrating the mechanical switch of the key structure according to the first embodiment of the present invention.

In this embodiment, the key structures 22 are mechanical key structures. Moreover, each key structure 22 comprises a mechanical switch. FIG. 6 is a schematic cross-sectional view illustrating the mechanical switch of the key structure according to the first embodiment of the present invention. The mechanical switch 224 is disposed on the circuit board 21. The mechanical switch 224 comprises a casing 2241, a push element 2242, a linkage element 2243, a first spring strip 2244, a second spring strip 2245 and an elastic element 2246. The linkage element 2243, the elastic element 2246, at least a part of the push element 2242, at least a part of the first spring strip 2244 and at least a part of the second spring strip 2245 are accommodated within the casing 2241. As shown in FIGS. 4 and 5, the casing 2241 of the mechanical switch 224 is disposed within the hollow part 22311 of the outer shell 2231 of the base 223. Moreover, at least a part of the mechanical switch 224 is penetrated through the hollow part 22311 and contacted with the keycap 221.

The casing 2241 comprises a pedestal 22411 and an upper cover 22412. The pedestal 22411 is covered by the upper cover 22412. Moreover, the upper cover 22412 has an opening 22413. A first end of the push element 2242 is penetrated through the opening 22413 and contacted with the keycap 221. A second end of the push element 2242 is disposed within the casing 2241 and connected with the linkage element 2243. The linkage element 2243 is located at a middle region of the pedestal 22411. Moreover, the linkage element 2243 is movable upwardly or downwardly relative to the pedestal 22411. The linkage element 2243 has a protrusion structure 22431. The protrusion structure 22431 is extended from a sidewall of the linkage element 2243 toward the first spring strip 2244. The elastic element 2246 is located under the linkage element 2243. A first end of the elastic element 2246 is connected with the linkage element 2243. A second end of the elastic element 2246 is fixed on the pedestal 22411. Moreover, the elastic element 2246 provides an elastic force to the linkage element 2243.

The first spring strip 2244 is located near a sidewall of the pedestal 22411. The first spring strip 2244 comprises a first electric connection part 22441, an elastic part 22442 and a first fixing part 22443. The first fixing part 22443 is fixed on the pedestal 22411. Moreover, the first fixing part 22443 is arranged between the first electric connection part 22441 and the elastic part 22442. The elastic part 22442 is disposed within the casing 2241 and contacted with the protrusion structure 22431 of the linkage element 2243. Moreover, the elastic part 22442 can be swung relative to the first fixing part 22443. After the first electric connection part 22441 is penetrated downwardly through the pedestal 22411, the first electric connection part 22441 is contacted and electrically connected with the circuit board 21. The second spring strip 2245 is arranged between the linkage element 2243 and the first spring strip 2244. The second spring strip 2245 comprises a second electric connection part 22451, a conduction part 22452 and a second fixing part 22453. The second fixing part 22453 is fixed on the pedestal 22411. Moreover, the second fixing part 22453 is arranged between the second electric connection part 22451 and the conduction part 22452. The conduction part 22452 is disposed within the casing 2241. After the second electric connection part 22451 is penetrated downwardly through the pedestal 22411, the second electric connection part 22451 is contacted and electrically connected with the circuit board 21.

Figure 7:
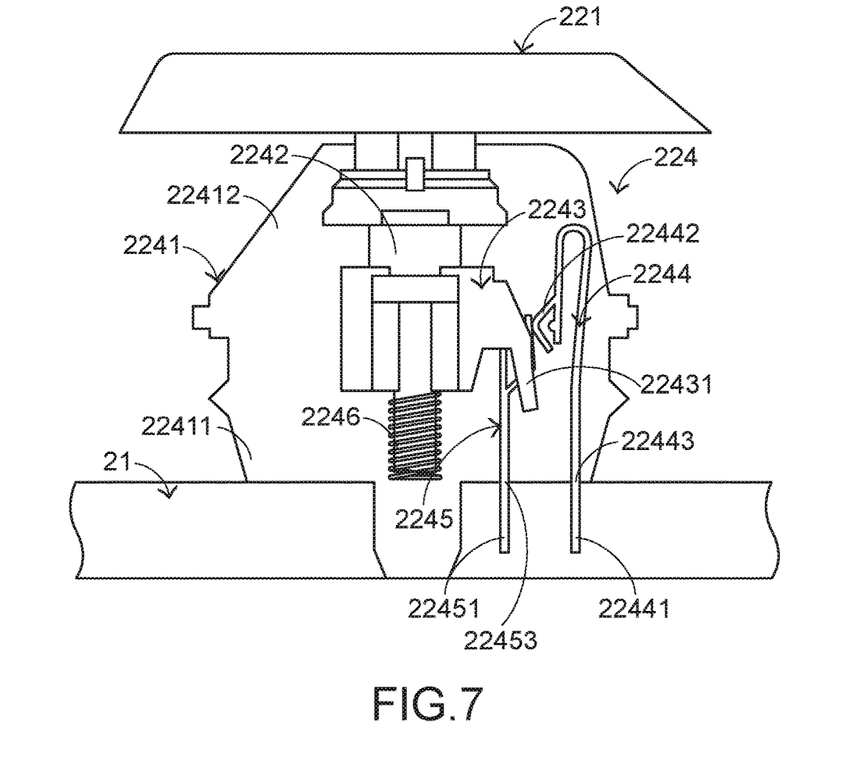
FIG. 7 is a schematic cross-sectional view illustrating the mechanical switch of the key structure of FIG. 6 when a keycap of the key structure is depressed.

The operations of the key structure 22 of the keyboard device 2 while the key structure 22 is depressed will be illustrated with reference to FIGS. 6 and 7. FIG. 7 is a schematic cross-sectional view illustrating the mechanical switch of the key structure of FIG. 6 when a keycap of the key structure is depressed. While the keycap 221 is depressed, the keycap 221 is moved downwardly to push the push element 2242. Since the linkage element 2243 is connected with the push element 2242, the linkage element 2243 is moved downwardly with the push element 2242. At the same time, the elastic element 2246 is compressed to generate the elastic force. As the linkage element 2243 is moved downwardly, the protrusion structure 22431 of the linkage element 2243 is contacted with the elastic part 22442 of the first spring strip 2244. Moreover, the protrusion structure 22431 is moved downwardly relative to the elastic part 22442 so as to push the elastic part 22442. Consequently, the elastic part 22442 is swung relative to the first fixing part 22443. As the linkage element 2243 is continuously moved downwardly, the swung elastic part 22442 correspondingly contacts and collides with the conduction part 22452 of the second spring strip 2245. Meanwhile, as shown in FIG. 7, the first spring strip 2244 and the second spring strip 2245 are in contact with each other. Consequently, the circuit board 21 generates a corresponding key signal. When the elastic part 22442 of the first spring strip 2244 collides with the conduction part 22452 of the second spring strip 2245, a click sound is generated. Due to the click sound, the user can feel the feedback of depressing the keycap 221. The operating principles of the mechanical switch 224 are well-known to those skilled in the art, and are not redundantly described herein. Moreover, the type of the mechanical switch 224 is not restricted to the mechanical switch shown in FIGS. 6 and 7.

Figure 8:
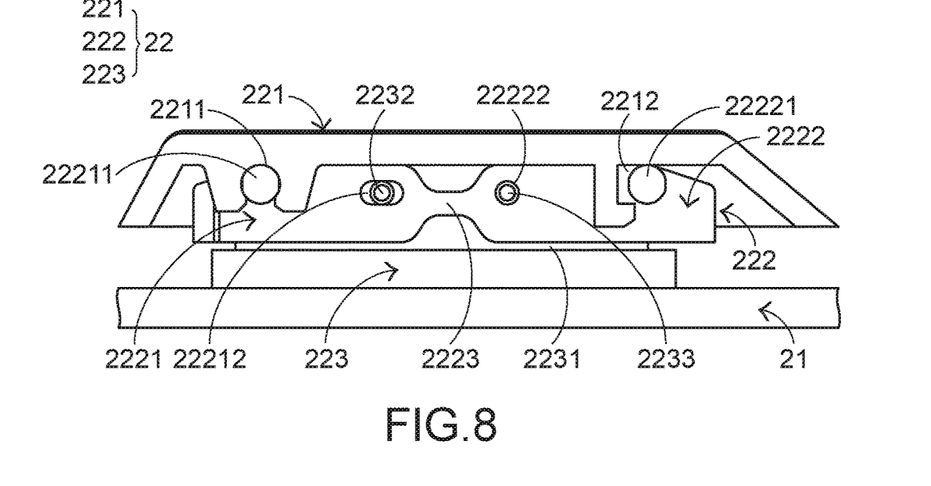
FIG. 8 is a schematic cross-sectional view illustrating the relationship between the keycap, the hinge element and the base of the key structure of FIG. 5, in which the keycap is depressed.

Please refer to FIGS. 5 and 8. FIG. 8 is a schematic cross-sectional view illustrating the relationship between the keycap, the hinge element and the base of the key structure of FIG. 5, in which the keycap is depressed. While the keycap 221 is depressed by the user and the keycap 221 is moved downwardly, the first hinge shaft 22211 and the second hinge shaft 22221 of the hinge element 222 are pushed by the locking holes 2211 and the sliding grooves 2212 at the two lateral sides of the keycap 221. Consequently, the two lateral sides of the hinge element 222 are moved downwardly, and a bending angle of the hinge element 222 is changed. At the same time, the first hinge shaft 22211 is rotated relative to the locking hole 2211, and the second hinge shaft 22221 is moved externally relative to the sliding groove 2212. Moreover, the second base shaft 2233 of the base 223 is rotated relative to the second receiving hole 22222 of the hinge element 222, and the first base shaft 2232 of the base 223 is rotated relative to the first receiving hole 22212 of the hinge element 222. Meanwhile, as shown in FIG. 8, the relative position between the first base shaft 2232 of the base 223 and the first receiving hole 22212 of the hinge element 222 is changed.

Moreover, when the keycap 221 is no longer depressed, the linkage element 2243 and the push element 2242 of the mechanical switch 224 are moved upwardly in response to the elastic force of the elastic element 2246. As the keycap 221 is pushed by the push element 2242, the keycap 221 is returned to its original position as shown in FIG. 5. While the keycap 221 is returned to its original position, the first hinge shaft 22211 and the second hinge shaft 22221 of the hinge element 222 are lifted by the locking holes 2211 and the sliding grooves 2212 at the two lateral sides of the keycap 221. Consequently, the two lateral sides of the hinge element 222 are moved upwardly, and the bending angle of the hinge element 222 is changed again. At the same time, the first hinge shaft 22211 is rotated relative to the locking hole 2211, and the second hinge shaft 22221 is moved internally relative to the sliding groove 2212. Moreover, the second base shaft 2233 of the base 223 is rotated relative to the second receiving hole 22222 of the hinge element 222, and the first base shaft 2232 of the base 223 is rotated relative to the first receiving hole 22212 of the hinge element 222. Meanwhile, as shown in FIG. 5, the relative position between the first base shaft 2232 of the base 223 and the first receiving hole 22212 of the hinge element 222 is changed to the initial state.

From the above descriptions, the keycap 221 is supported by the push element 2242 of the mechanical switch 224 while the key structure 22 of the keyboard device 2 is depressed or released. Moreover, while the key structure 22 of the keyboard device 2 is depressed or released, the edge of the keycap 221 is lowered or lifted by the hinge element 221, which is connected with the two lateral sides of the keycap 221. Consequently, the keycap 221 can be smoothly moved upwardly or downwardly, and the rocking problem of the keycap 221 is avoided. Under this circumstance, the tactile feel of operating the keycap 221 is enhanced.

The above example is presented herein for purpose of illustration and description only. The connecting relationship between the keycap 221 and the hinge element 222 and the connecting relationship between the hinge element 222 and the base 223, the position of the base 223, the type of the mechanical switch 224 and the type of the key structure 22. It is noted that numerous modifications and alterations may be made while retaining the teachings of the invention.

Some other embodiments of the keyboard device of the present invention will be described as follows.

The second embodiment is a variant example of the first embodiment. In the second embodiment, the base 223 of the key structure 22 is installed on the upper cover 22412 of the casing 2241 of the mechanical switch 224. Similarly, while the key structure 22 of the keyboard device 2 is depressed or released, the edge of the keycap 221 is lowered or lifted by the hinge element 222, which is connected between the base 223 and the keycap 221. Consequently, the keycap 221 can be smoothly moved upwardly or downwardly, and the rocking problem of the keycap 221 is avoided.

The third embodiment is another variant example of the first embodiment. In the third embodiment, the base 223 of the key structure 223 is used as the casing 2241 of the mechanical switch 224. The first base shaft 2232 and the second base shaft 2233 are respectively penetrated through the first receiving hole 22212 and the second receiving hole 22222 of the hinge element 222. In this embodiment, the first base shaft 2232 and the second base shaft 2233 are installed on the casing 2241 of the mechanical switch 224. Similarly, while the key structure 22 of the keyboard device 2 is depressed or released, the edge of the keycap 221 is lowered or lifted by the hinge element 221, which is connected between the base 223 and the keycap 221. Consequently, the keycap 221 can be smoothly moved upwardly or downwardly, and the rocking problem of the keycap 221 is avoided.

Figure 9:
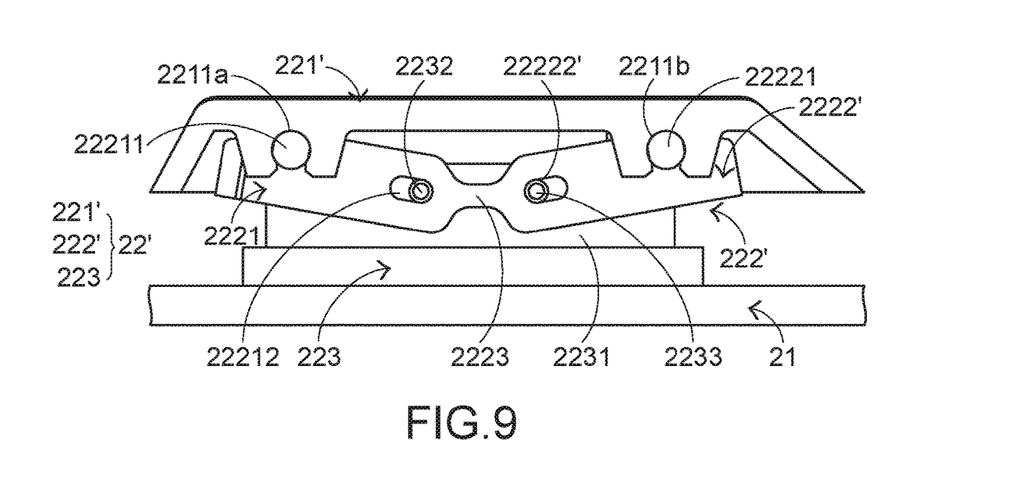
FIG. 9 is a schematic cross-sectional view illustrating the relationship between a keycap, a hinge element and a base of a key structure and a circuit board according to a fourth embodiment of the present invention.

FIG. 9 is a schematic cross-sectional view illustrating the relationship between a keycap, a hinge element and a base of a key structure and a circuit board according to a fourth embodiment of the present invention. The components of the keyboard device that are similar to those of the first embodiment are not redundantly described herein. In comparison with the first embodiment, the following items are distinguished. Each lateral side of the keycap 221' of the key structure 22' comprises two locking holes 2211a and 2211b. The first hinge shaft 22211 of the first lateral wing part 2221 of the hinge element 222' is pivotally coupled to the locking hole 2211a. The second hinge shaft 22221 of the second lateral wing part 2222' of the hinge element 222' is pivotally coupled to the locking hole 2211b. The second base shaft 2233 is penetrated through the second receiving hole 22222' of the base 223 of the hinge element 222'. In this embodiment, the length of the second receiving hole 22222' is increased when compared with the first embodiment. Consequently, the relative position between the second base shaft 2233 and the second receiving hole 22222' is changeable according to the bending angle of the hinge element 222'.

Figure 10:
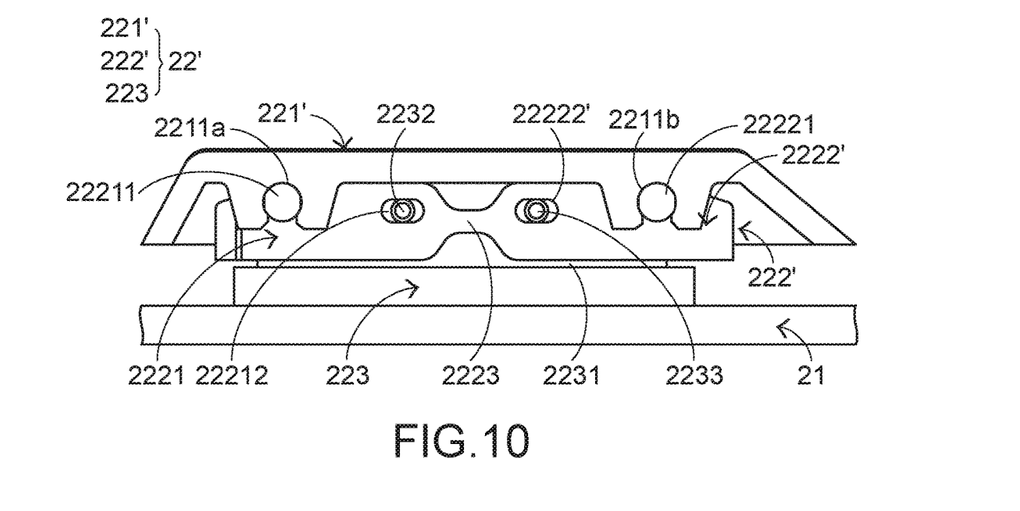
FIG. 10 is a schematic cross-sectional view illustrating the relationship between the keycap, the hinge element and the base of the key structure of FIG. 9, in which the keycap is depressed.

Please refer to FIGS. 9 and 10. FIG. 10 is a schematic cross-sectional view illustrating the relationship between the keycap, the hinge element and the base of the key structure of FIG. 9, in which the keycap is depressed. While the keycap 221' is depressed by the user and the keycap 221' is moved downwardly, the first hinge shaft 22211 and the second hinge shaft 22221 of the hinge element 222' are pushed by the locking holes 2211a and the locking holes 2211b at the two lateral sides of the keycap 221'. Consequently, the two lateral sides of the hinge element 222' are moved downwardly, and a bending angle of the hinge element 222' is changed. At the same time, the first hinge shaft 22211 is rotated relative to the locking hole 2211a, and the second hinge shaft 22221 is rotated relative to locking hole 2211b. As shown in FIG. 10, the relative position between the first base shaft 2232 of the base 223 and the first receiving hole 22212 of the hinge element 222' and the relative position between the second base shaft 2233 of the base 223 and the second receiving hole 22222' of the hinge element 222' are changed.

Moreover, when the keycap 221' is no longer depressed, the linkage element 2243 and the push element 2242 of the mechanical switch 224 are moved upwardly in response to the elastic force of the elastic element 2246. For succinctness, the linkage element 2243, the push element 2242 and the elastic element 2246 are not shown in FIGS. 9 and 10. The structures of these components may be referred to FIGS. 6 and 7. As the keycap 221' is pushed by the push element 2242, the keycap 221' is returned to its original position as shown in FIG. 9. While the keycap 221' is returned to its original position, the first hinge shaft 22211 and the second hinge shaft 22221 of the hinge element 222' are lifted by the locking holes 2211a and 2211b at the two lateral sides of the keycap 221'. Consequently, the two lateral sides of the hinge element 222' are moved upwardly, and the bending angle of the hinge element 222' is changed again. At the same time, the first hinge shaft 22211 is rotated relative to the locking hole 2211a, and the second hinge shaft 22221 is rotated relative to the locking hole 2211b. Meanwhile, as shown in FIG. 9 the relative position between the first base shaft 2232 of the base 223 and the first receiving hole 22212 of the hinge element 222' and the relative position between the second base shaft 2233 of the base 223 and the second receiving hole 22222' of the hinge element 222' are changed to the initial state.

Figure 11:
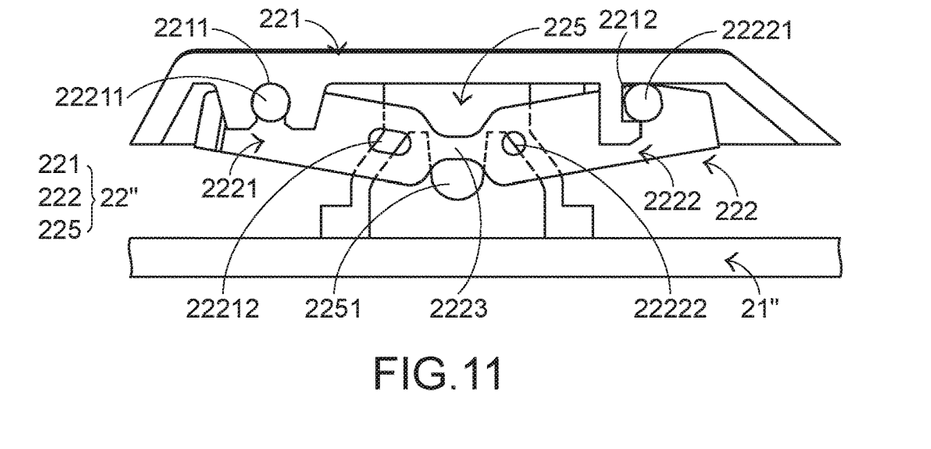
FIG. 11 is a schematic cross-sectional view illustrating the relationship between a key structure and a circuit board according to a fifth embodiment of the present invention.
Figure 12:
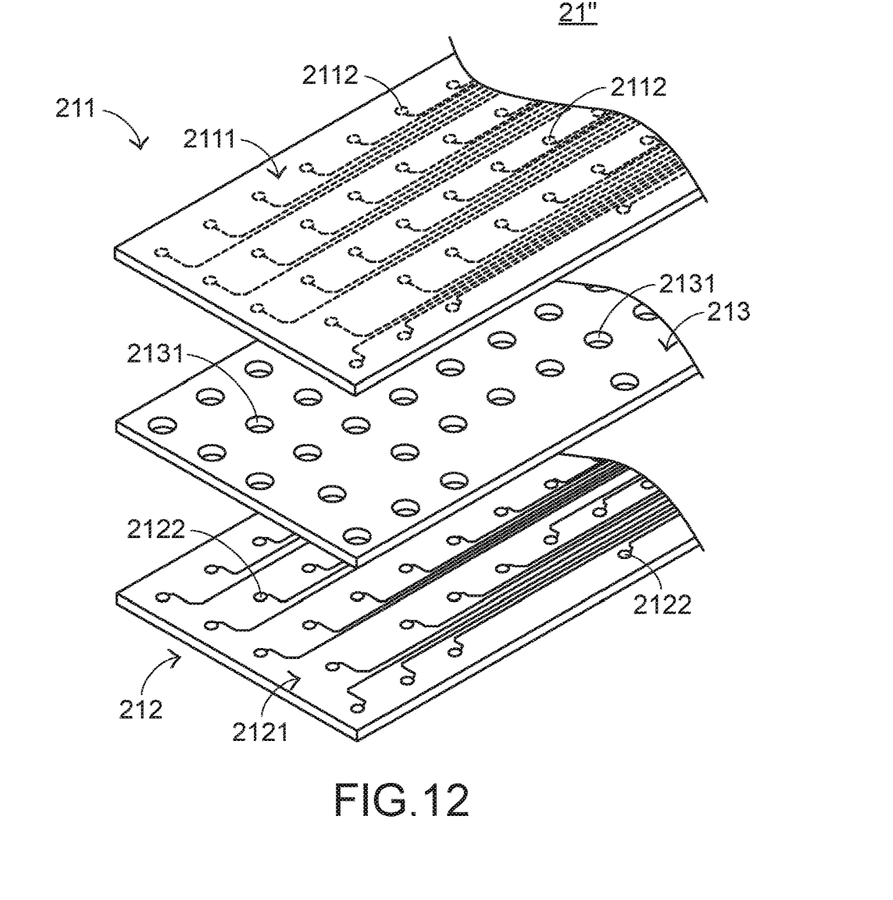
FIG. 12 is a schematic exploded view illustrating the circuit board of FIG. 11.

Please refer to FIGS. 11 and 12. FIG. 11 is a schematic cross-sectional view illustrating the relationship between a key structure and a circuit board according to a fifth embodiment of the present invention. FIG. 12 is a schematic exploded view illustrating the circuit board of FIG. 11. For succinctness, the base of the key structure is not shown in FIG. 11. The components of the keyboard device that are similar to those of the first embodiment are not redundantly described herein. In comparison with the first embodiment, the following items are distinguished. Firstly, the circuit board 21" is a membrane circuit board. Secondly, the key structure 22" further comprises an elastomer 225. The elastomer 225 further comprises a contacting part 2251. The contacting part 2251 is arranged between the keycap 221 and the circuit board 21". Moreover, the contacting part 2251 is disposed within the hollow part 22311 of the base 223. For succinctness, the hollow part 22311 and the base 223 are not shown in FIG. 11. The structure of the base 223 may be referred to FIGS. 5 and 8, and the structure of the hollow part 22311 may be referred to FIG. 4.

The membrane circuit board 21" comprises plural film layers, which are arranged in a stack form. In this embodiment, the membrane circuit board 21" comprises an upper film layer 211 and a lower film layer 212. A first circuit pattern 2111 is formed on a bottom surface of the upper film layer 211. The first circuit pattern 2111 comprises plural upper contacts 2112 corresponding to the plural key structures 22". A second circuit pattern 2121 is formed on a top surface of the lower film layer 212. The second circuit pattern 2121 comprises plural lower contacts 2122 corresponding to the plural upper contacts 2112. Each of the upper contacts 2112 and the corresponding lower contact 2122 are separated from each other by a spacing interval. Moreover, each of the upper contacts 2112 and the corresponding lower contact 2122 are collectively defined as a membrane switch. Moreover, for maintaining the spacing interval between each upper contact 2112 and the corresponding lower contact 2122, the circuit board 21" further comprises an intermediate film layer 213. The intermediate film layer 213 is arranged between the upper film layer 211 and the lower film layer 212. In addition, the intermediate film layer 213 comprises plural perforations 2131 corresponding to the plural upper contacts 2112 and the plural lower contacts 2122.

While the keycap 221 of any key structure 22" is depressed, the keycap 221 is moved downwardly relative to the circuit board 21". As the keycap 221 is moved downwardly to compress the elastomer 225, the corresponding upper contact 2112 is pushed and triggered by the contacting part 2251 of the elastomer 225. Consequently, the corresponding upper contact 2112 is contacted with the corresponding lower contact 2122 through the corresponding perforation 2131. In such way, the corresponding membrane switch is electrically conducted, and the circuit board 21" generates a corresponding key signal. When the keycap 221 of the key structure 22" is no longer depressed, the keycap 221 is moved upwardly relative to the circuit board 21" in response to an elastic force of the elastomer 225.

Similarly, while the key structure 22" is depressed or released, the keycap 221 is supported by the elastomer 225. Moreover, the edge of the keycap 221 is lowered or lifted by the hinge element 222, which is connected with the two lateral sides of the keycap 221. Consequently, the keycap 221 can be smoothly moved upwardly or downwardly, and the rocking problem of the keycap 221 is avoided. Under this circumstance, the tactile feel of operating the keycap 221 is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A key structure, comprising:
   a keycap;
   a hinge element comprising a first lateral wing part, a second lateral wing part and a bendable part, wherein the bendable part is connected between the first lateral wing part and the second lateral wing part, and the bendable part is thinner than the first lateral wing part and the second lateral wing part, wherein the first lateral wing part and the second lateral wing part are connected with the keycap, the first lateral wing part comprises a first receiving hole, and the second lateral wing part comprises a second receiving hole; and
   a base comprising a first base shaft and a second base shaft, wherein the first base shaft is penetrated through the first receiving hole, and the second base shaft is penetrated through the second receiving hole, wherein while the keycap is moved upwardly or downwardly relative to the base, a bending angle of the hinge element and a relative position between the first base shaft and the first receiving hole are changed, wherein the base comprises an outer shell with a hollow part, and the first base shaft and the second base shaft are disposed on the outer shell.

2. The key structure according to claim 1, wherein the first lateral wing part further comprises a first hinge shaft, and the second lateral wing part further comprises a second hinge shaft, wherein the first hinge shaft is connected with an end of the keycap, and the second hinge shaft is connected with another end of the keycap.

3. The key structure according to claim 2, wherein the first hinge shaft is located at an end of the first lateral wing part, the first receiving hole is located at the other end of the first lateral wing part, and the first receiving hole is arranged between the first hinge shaft and the bendable part.

4. The key structure according to claim 2, wherein the second hinge shaft is located at an end of the second lateral wing part, the second receiving hole is located at the other end of the second lateral wing part, and the second receiving hole is arranged between the second hinge shaft and the bendable part.

5. The key structure according to claim 2, wherein one of two lateral sides of the keycap comprises a locking hole and a sliding groove, wherein the locking hole is connected with the first hinge shaft, and the sliding groove is connected with the second hinge shaft.

6. The key structure according to claim 1, wherein one of two lateral sides of the keycap comprises a first locking hole and a second locking hole, wherein the first locking hole is connected with the first hinge shaft, and the second locking hole is connected with the second hinge shaft, wherein while the keycap is moved upwardly or downwardly relative to the base, a relative position between the second base shaft and the second receiving hole is changed.

7. The key structure according to claim 1, wherein the key structure is a mechanical key structure with a mechanical switch, and the outer shell of the base is installed on the mechanical switch or a circuit board of a keyboard device, and at least a part of the mechanical switch is penetrated through the hollow part and contacted with the keycap.

8. The key structure according to claim 7, wherein the mechanical switch comprises:
  a push element, wherein an end of the push element is contacted with the keycap;
  a linkage element connected with the push element;
  a first spring strip electrically connected with a circuit board of a keyboard device;
  a second spring strip electrically connected with the circuit board of the keyboard device; and
  a casing, wherein at least a part of the push element, the linkage element, at least a part of the first spring strip and at least a part of the second spring strip are accommodated within the casing,
  wherein while the keycap is depressed and the push element is moved downwardly, the linkage element is moved downwardly and the first spring strip is contacted with the second spring strip, so that the circuit board generates a key signal.

9. The key structure according to claim 1, wherein the outer shell of the base is installed on a circuit board of a keyboard device.

10. The key structure according to claim 9, wherein the key structure further comprises an elastomer, and the elastomer is arranged between the keycap and the circuit board and comprises a contacting part, wherein while the keycap is depressed, the elastomer is compressed and a membrane switch of the circuit board is pushed by the contacting part, wherein when the keycap is not depressed, the keycap is returned to an original position in response to an elastic force provided by the elastomer.

11. The key structure according to claim 1, further comprising:
  a push element, wherein an end of the push element is contacted with the keycap;
  a linkage element connected with the push element;
  a first spring strip electrically connected with a circuit board of a keyboard device; and
  a second spring strip electrically connected with the circuit board of the keyboard device,
  wherein the base is fixed on the circuit board of the keyboard device, and at least a part of the push element, the linkage element, at least a part of the first spring strip and at least a part of the second spring strip are accommodated within the base, wherein while the keycap is depressed and the push element is moved downwardly, the linkage element is correspondingly moved downwardly and the first spring strip is contacted with the second spring strip, so that the circuit board generates a key signal.

12. The key structure according to claim 1, wherein the hinge element is an integral structure.

13. A keyboard device, comprising:
  a circuit board; and
  plural key structures installed on the circuit board, wherein when one of the plural key structures is depressed, the circuit board generates a corresponding key signal, wherein each of the plural key structures comprises:
    a keycap;
    a hinge element comprising a first lateral wing part, a second lateral wing part and a bendable part, wherein the bendable part is connected between the first lateral wing part and the second lateral wing part, and the bendable part is thinner than the first lateral wing part and the second lateral wing part, wherein the first lateral wing part and the second lateral wing part are connected with the keycap, the first lateral wing part comprises a first receiving hole, and the second lateral wing part comprises a second receiving hole; and
    a base comprising a first base shaft and a second base shaft, wherein the first base shaft is penetrated through the first receiving hole, and the second base shaft is penetrated through the second receiving hole, wherein while the keycap is moved upwardly or downwardly relative to the base, a bending angle of the hinge element and a relative position between the first base shaft and the first receiving hole are changed, wherein the base comprises an outer shell with a hollow part and the first base shaft ad the second base shaft are disposed on the outer shell.

14. The keyboard device according to claim 13, wherein the keyboard device is a mechanical keyboard device with a mechanical switch, and the outer shell of the base is installed on the mechanical switch or the circuit board, and at least a part of the mechanical switch is penetrated through the hollow part and contacted with the keycap.

15. The keyboard device according to claim 14, wherein the mechanical switch comprises:
  a push element, wherein an end of the push element is contacted with the keycap;
  a linkage element connected with the push element;
  a first spring strip electrically connected with the circuit board;
  a second spring strip electrically connected with the circuit board; and
  a casing, wherein at least a part of the push element, the linkage element, at least a part of the first spring strip and at least a part of the second spring strip are accommodated within the casing,
  wherein while the keycap is depressed and the push element is moved downwardly, the linkage element is correspondingly moved downwardly and the first spring strip is contacted with the second spring strip, so that the circuit board generates the key signal.

16. The keyboard device according to claim 13, wherein the outer shell of the base is installed on the circuit board.

17. The keyboard device according to claim 16, wherein the keyboard device further comprises an elastomer, and the elastomer is arranged between the keycap and the circuit board and comprises a contacting part, wherein while the keycap is depressed, the elastomer is compressed and a membrane switch of the circuit board is pushed by the contacting part, wherein when the keycap is not depressed, the keycap is returned to an original position in response to an elastic force provided by the elastomer.

18. The keyboard device according to claim 13, wherein at least one of the plural key structures further comprises:
  a push element, wherein an end of the push element is contacted with the keycap;

a linkage element connected with the push element;
a first spring strip electrically connected with the circuit board; and
a second spring strip electrically connected with the circuit board,
wherein the base is fixed on the circuit board of the keyboard device, and at least a part of the push element, the linkage element, at least a part of the first spring strip and at least a part of the second spring strip are accommodated within the base, wherein while the keycap is depressed and the push element is moved downwardly, the linkage element is moved downwardly and the first spring strip is contacted with the second spring strip, so that the circuit board generates a key signal.

* * * * *